Jan. 28, 1964   J. C. SIMON   3,119,918
ELECTRIC HEATER
Filed Jan. 3, 1961   6 Sheets-Sheet 1

Jan. 28, 1964  J. C. SIMON  3,119,918
ELECTRIC HEATER
Filed Jan. 3, 1961  6 Sheets-Sheet 3

Jan. 28, 1964     J. C. SIMON     3,119,918
ELECTRIC HEATER
Filed Jan. 3, 1961     6 Sheets-Sheet 4

Jan. 28, 1964  J. C. SIMON  3,119,918
ELECTRIC HEATER
Filed Jan. 3, 1961  6 Sheets-Sheet 5
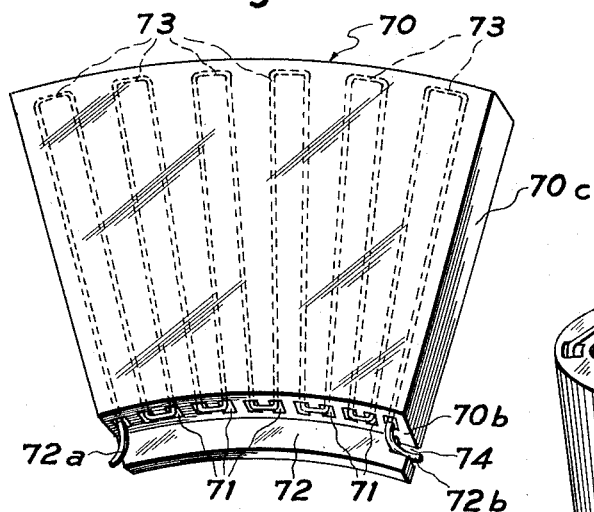
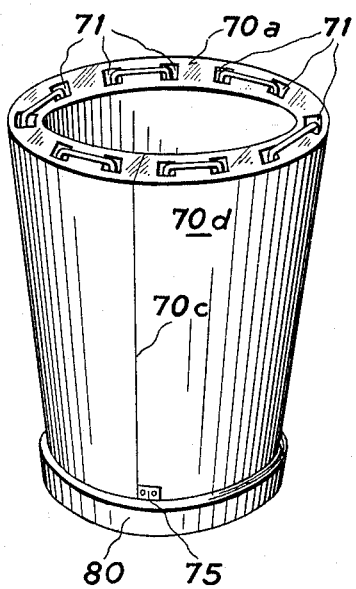
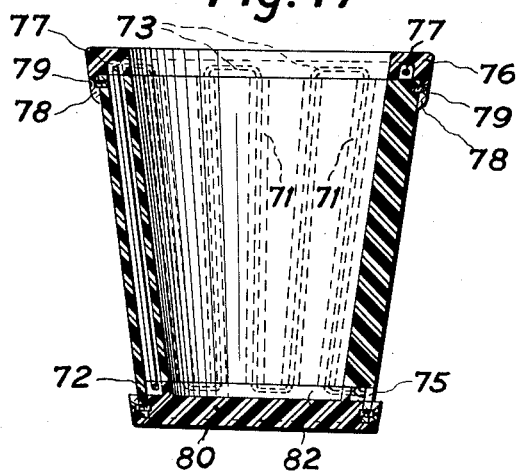
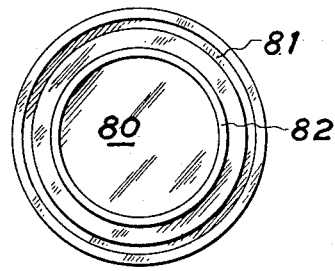

United States Patent Office 3,119,918
Patented Jan. 28, 1964

3,119,918
ELECTRIC HEATER
Juan Casas Simon, Martinez Anido 2, Sabadell, Spain
Filed Jan. 3, 1961, Ser. No. 80,373
6 Claims. (Cl. 219—19)

This invention relates to a low temperature electric heater which can be used as an independent apparatus for drying towels, damp articles of clothing, for heating textile articles which are intended to come into contact with the human skin, like bed-clothes, underclothing, etc., or for distributing heat to human beings by direct contact or by short-distance radiation, and which can be used as well as a panel or sheet in the manufacture of textile or industrial dryers, heating screens to be used indoors, shutters, trays, buckets and other receptacles, or can be applied for heating purposes to the walls, floors, ceilings, columns, etc.

The electric heater according to the present invention comprises a body made of a synthetic moldable plastic material non-adhesive at atmospheric pressure at temperatures ranging from $-40°$ C. to $+80°$ C., said body being of slight thickness in comparison to its remaining dimensions and having in its interior a plurality of ducts connected one to another, said ducts being regularly distributed over the body, the inner space constituted by said ducts together being sealed tight; at least one electrical resistance within said body, said electrical resistance being loose in the said inner space defined by the ducts and being fixed to said body only at its two ends, said electrical resistance being disposed along all the path defined by said ducts, the said electrical resistance being adapted to expand freely in said ducts, the length, cross-section and resistivity of the electrical resistance being such that the maximum temperature attainable in operation is substantially less than the softening temperature of the plastic material constituting the body, the said ends of the electrical resistance being provided with connecting means adapted to be connected to the source of electric current.

In an embodiment of the invention the body consists of a plate and the ducts are disposed on several levels, the ducts in each level having an electrical resistance. A selector switch allows for the connection of one or more electrical resistances, it being thus possible to graduate the temperature in a uniform wall over all the surface of the heater. The ends of each electrical resistance are connected to the source of electric current.

In a preferred embodiment of the invention three levels of ducts are provided in the plate. The said ducts are made by known techniques when molding the plate, so that no further manipulation thereof is necessary.

In another embodiment, the plate is made by the superposition of several sheets which define between them a plurality of ducts disposed on various, preferably three, levels.

At each side of the plate where the ends of the ducts emerge, is provided one covering strip having, on the inner side, a groove where the exposed portions of the electrical resistance are freely lodged.

According to another embodiment, the body consists of a panel shaped as a part of a building and adapted to be applied thereto. The heater can consist of one or more adjacent panels, having connecting means to fasten each two adjacent panels.

According to still another embodiment, the body constitutes the side wall of a receptacle, such as a bucket. Said side wall can be reshaped out of a plate of a thermoplastic material having a front surface of slightly smaller dimensions than the back surface, the bottom of the bucket being provided with at least one annular projection and one annular recess in which the lower surface of said side wall is fitted. An annular covering strip is adapted to fit on the upper surface of the said side wall. Said bottom and said annular strip define, together with the lower and upper surfaces of said side wall, two ducts, communicating with the ducts in said body, said two ducts containing the exposed ends of the electrical resistance.

Said side wall can also be formed with two truncated conical tubular portions fitting one inside the other defining, by means of grooves, a helical duct and a straight duct uniting the ends of the helical duct.

The body can be made of any suitable moldable synthetic plastic material of the thermoplastic or thermosetting type by any of the known techniques of handling plastic materials: casting, extrusion, compression or injection, or by any combination thereof. As examples of thermoplastic materials which can be suitably used are cellulose acetate, polyvinyl chloride, polyestyrene, polyolefins, polyfluoroethylene, polyacrylics, polyamides, polyurethanes, polycarbonates. As example of thermosetting plastic materials which can be suitably used are phenoplastics, aminoplasts and polyesters. Those moldable plastics can receive in small quantities auxiliary products which help to obtain more perfect pieces, such as plasticizers, hardeners, coloring pigments, catalysts, filling, bleaching agents and similar products.

According to the present invention, it is possible to manufacture heaters having very thin walls and wide ducts, thus reducing to a minimum the dilation of the plate and the weight thereof, and making it very easy to pass the conductors through the plate.

It is known by prior art the use of: brittle materials such as glass; heavy materials such as cement and porcelain; adhesive materials adapted to stick together sheets of paper, wood, textiles, etc., to form packages jamming in their interior an electrical resistance. But it is not known by prior art the use of plastic materials non-adhesive at temperatures ranging from $-40°$ C. to $+80°$ C., of the type mentioned above, which cannot be used as adhesive with respect to other materials and are neither brittle nor heavy, in order to manufacture a heater which can be used with damp things since it does not allow the dampness to come into its inner hollow parts having the electrical resistance because said inner hollow parts are sealed tight.

On the other hand, the electrical resistance being freely placed in the interior of the plate, it can expand by heat without being subject to stress of any kind. Consequently, the conductors are not subject to breakage as in the heaters having a resistance embedded in the plate.

Furthermore, the apparatus of the invention is quite easy to assemble and to disassemble since only screws are used to secure together the parts thereof.

Several preferred embodiments of the present invention will be described in connection with the annexed drawings.

FIG. 13b is a perspective view of a covering strip to be applied to the body shown in FIG. 13a.

FIG. 15 shows a plate from which the side wall of a receptacle can be made.

FIG. 16 shows the plate of FIG. 15 after it has been given its ultimate shape.

FIG. 17 is the longitudinal cross-section of a receptacle embodying the plate shown in FIGS. 15 and 16.

FIG. 18 is a top plan view of the bottom of the receptacle shown in FIG. 17.

In FIGS. 1 to 6 is shown an embodiment of the invention consisting in a heater 1 adapted to dry textile articles such as towels, damp articles of clothing, etc., or to heat textile articles intended to come into contact with the human skin (bed-clothes, underclothing, etc.), or to distribute heat to human beings by direct contact or short-distance radiation.

Figure 1:
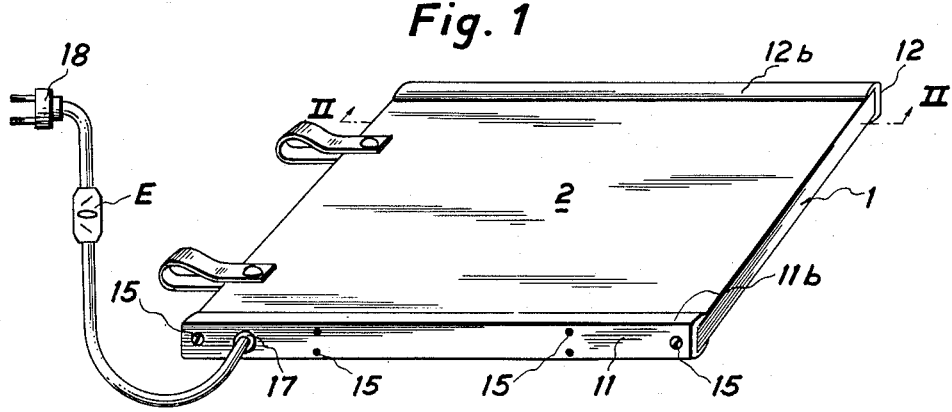
FIG. 1 is a perspective view of an apparatus according to one embodiment of the invention.
Figure 2:
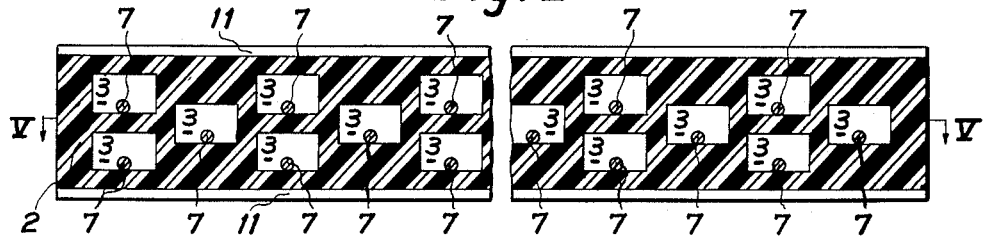
FIG. 2 is a cross-section along line II—II of FIG. 1.
Figure 3:
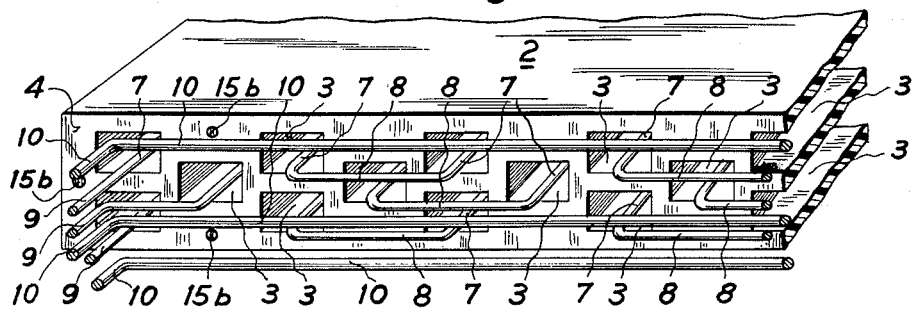
FIG. 3 is a partial perspective view of the front edge of the plate of the apparatus of FIG. 1, the covering strip having been removed.
Figure 4:
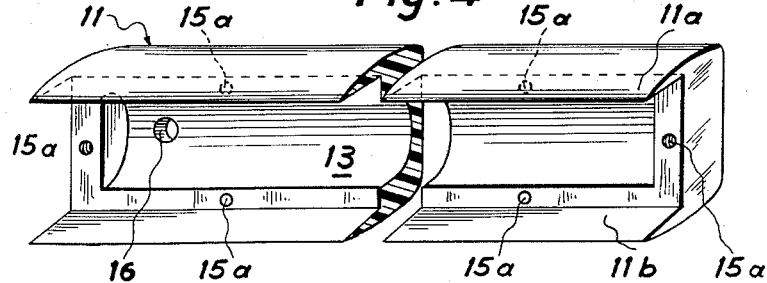
FIG. 4 is a partial perspective view of the covering strip.
Figure 5:
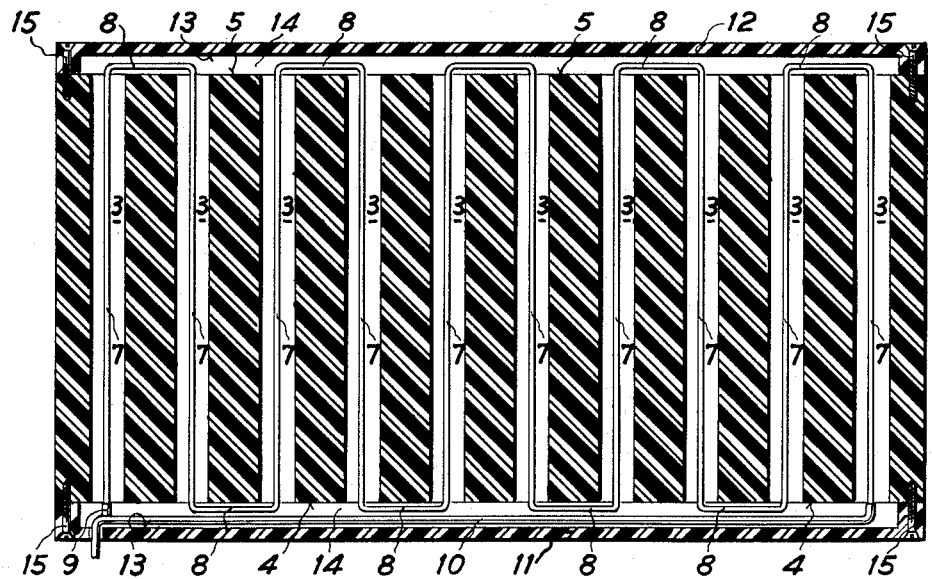
FIG. 5 is a longitudinal section of the apparatus of FIG. 1 along line V—V of FIG. 2.
Figure 6:
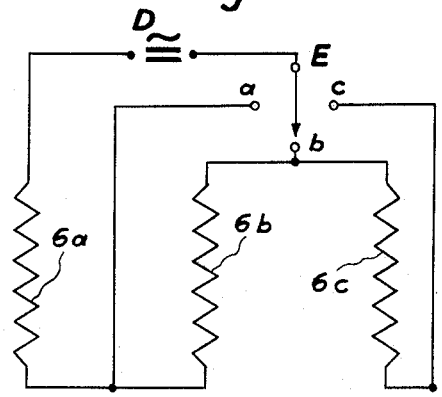
FIG. 6 is a diagrammatical representation of the electrical parts of the apparatus of FIG. 1.
Figure 8:
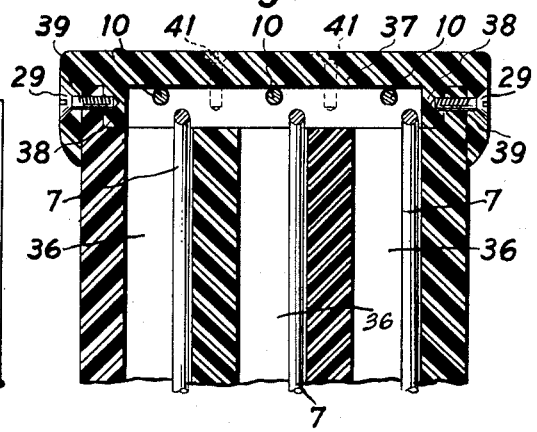
FIG. 8 is a partial section of the apparatus shown in FIG. 7, along line VIII—VIII.

The heater 1 comprises a plate 2 of synthetic plastic material of the thermoplastic or thermosetting type of slight thickness in comparison to its remaining dimensions. A suitable size would be, for example, 32 cm. width, 36 cm. length, and 0.5 cm. thickness. The plate 2 is formed with a plurality of ducts 3 disposed on three levels, said ducts passing through the plate 2 from one edge 4 to opposite edge 5. Three electrical resistances 6a, 6b, 6c, are disposed in the interior of said ducts 3, each resistance being on a different level of ducts. Each electrical resistance is formed of a series of conductors 7 emerging at the ends of the ducts, said conductors being interconnected by means of connections 8. In fact each resistance is formed of one wire disposed in zig-zag. Preferably, the two ends 9 and 10 of each electrical resistance are provided with a coat of isolating material, which, according to the case, may be cotton, plastic material of the same or a similar type as the plate 1, asbestos, or any other suitable isolating material. Along each of the opposite edges 4 and 5 of the plate 2 are placed strips 11 (FIGS. 1 and 4) and 12 (FIG. 5). Each strip has a groove 13, which together with edges 4 and 5 delimit two enclosed spaces 14 into which ducts 7 emerge. Strips 11 and 12 are connected to the edges of the plate by means of screws 15 passing through threaded holes 15a and 15b. Strip 11 has a hole 16 through which pass the ends 9, 10, of the three electrical resistances 6a, 6b, 6c. Said ends are connected to the current input D through a selector switch E (FIG. 6) which makes it possible to graduate the temperature of the heater by connecting one, two or three electrical resistances when the switch is set to contacts a, b or c, respectively. Thus, for a plate of the above mentioned dimensions made of polymethacrylate of polymethyl, being furnished with resistances of Nichrome wire having a diameter in cross-section of 0.2 mm. and a total length of 9 metres connected to a 125 volts current source, the maximum temperature attainable is 60° C. and can be graduated to 40° C. or 20° C.

The ends 8, 9, coated with an isolating material, pass through hole 16 and through another hole provided in reinforcing piece 17 and are connected to a switch 18, a selector switch E being interposed.

Strips 11 and 12 are provided along their longest edges with protective flaps 11a, 11b and 12a, 12b, which pass over the edges of plate 2 and are tightly applied against the adjacent zone of the bigger surfaces of plate 2. They thus protect the surfaces of contact of the covering strips 11, 12 and said plate 2.

It is to be understood that the ensemble of the ducts 3 and spaces 14, 15 is sealed and there is no possibility of any dampness or dust getting through into the hollow parts of the apparatus.

It is also to be understood that the plate, when made of thermoplastic material can be re-shaped to take any suitable form. In the case of thermosetting materials, the desired shape must be given when molding the plate.

When the heating device according to the invention is to be used in panels for the construction of textile or industrial dryers, screens, tables, walls, floors, ceilings, or similar articles, the embodiment shown in FIGS. 7 to 11 may be more suitable. According to this embodiment, the panel is made of several sheets of plastic material. The top sheet 20a and the bottom sheet 20b are shown respectively in FIGS. 9 and 11. They have a flat surface 21a, 21b and a surface 22a, 22b provided with a plurality of transversal projections 23 and 24a, 24b, respectively. Sheets 20a and 20b have along their front and back edges two lateral extensions 25a, 25b, and 26a, 26b, having series of threaded holes 27 and 28 adapted to receive screws 29. The two extreme projections 23 and 24a, 24b, are provided with holes 30 adapted to receive screws 31.

Intermediate sheets 32 are provided on their upper surface with a plurality of transversal projections 33a, 33b, identical to projections 24a, 24b, and on their lower surfaces with a plurality of transversal projections 34, identical to projections 23, the extreme projections having threaded holes 35 adapted to receive screws 31.

Figure 7:
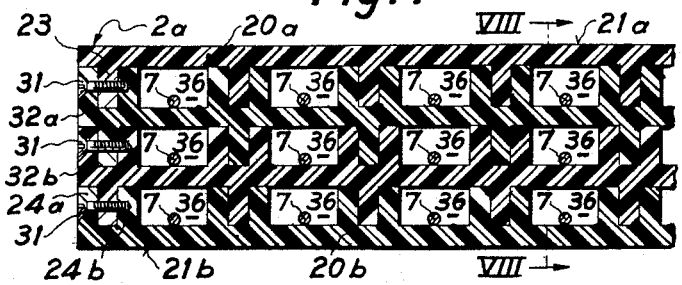
FIG. 7 is a cross-section of an embodiment of the invention especially applicable to heating panels.
Figure 9:
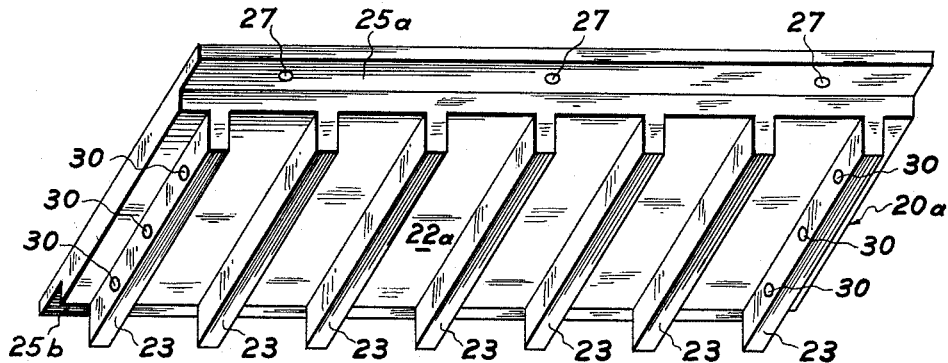
FIG. 9 is a perspective view of an upper sheet of the embodiment shown in FIG. 7.
Figure 10:
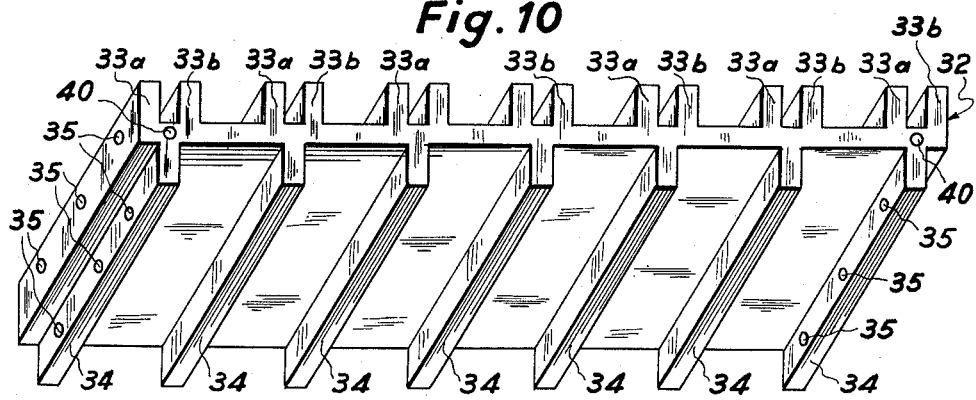
FIG. 10 is a perspective view of an intermediate sheet of the embodiment shown in FIG. 7.
Figure 11:
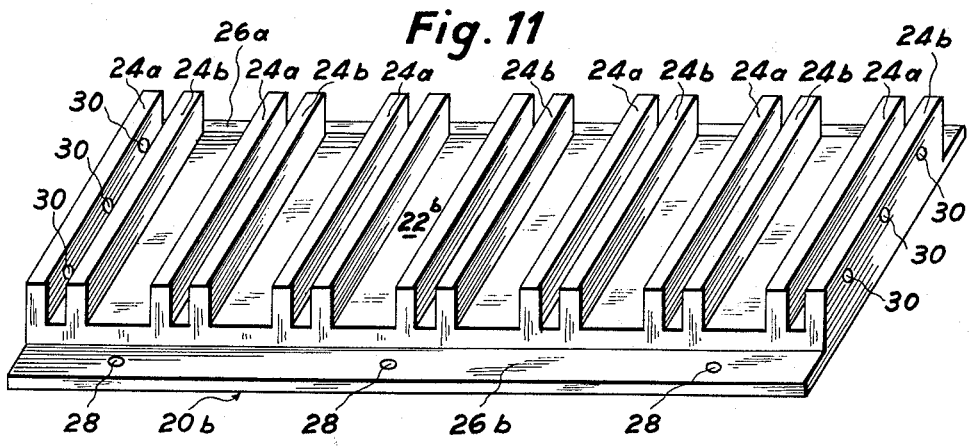
FIG. 11 is a perspective view of a lower sheet of the embodiment shown in FIG. 7.

In FIG. 7 it is shown how sheets 20a, 20b, and 32, are connected together to form a plate 2a. Projections 23 of the upper sheet 20a are jammed between projections 33a, 33b, of the upper intermediate sheet 32a; the same thing occurs with projections 34 of sheet 32a and of sheet 32b with respect of projections 33a, 33b, of sheet 32b and projections 24a, 24b, of sheet 20b. When the four sheets are assembled, they are secured with screws 31, and define ducts 36 through which pass conductors 7 of the electrical resistances. Ducts 36 correspond to ducts 3 of the first embodiment.

In said plate 2a the ducts 36 which are defined by the sheets are also disposed on three levels, but the ducts are symmetrically superimposed.

The electrical parts 7, 8, 9, 10, are the same as in the embodiment previously described, and a selector switch is also preferably disposed in order to regulate the temperature of the heating device. Strips 37 are also adhered to the front and back edges of the plate to keep its hollow parts hermetically sealed. Parts 17, 18 and 19 are usually unnecessary in this second embodiment.

In order to help securing the strips 37 to the plate 2a, each strip is provided, along its longest edges with projections 38 and flaps 39 adapted to jam between them lateral extensions 25a, 25b, and 26a, 26b, of sheets 20a, 20b. The strips 37 are secured to the plate 2a by means of screws 29 passing through threaded holes 28, and screws 41 passing through threaded holes 40.

It is understood that many levels of ducts can be obtained by providing more intermediate sheets, but usually three levels will be sufficient for the normal purposes of the heating device according to the invention.

Figure 12:
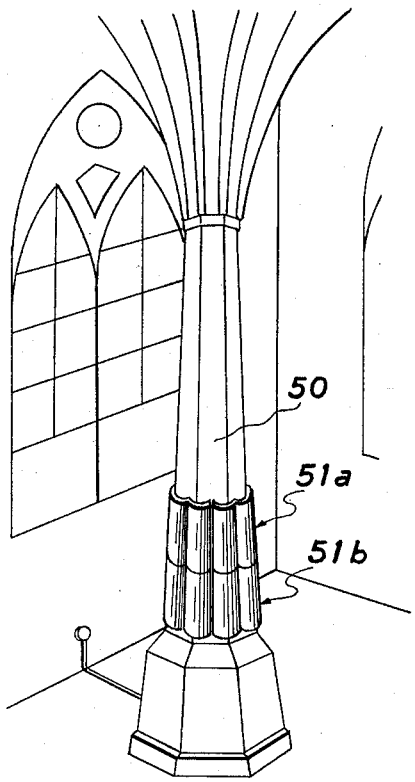
FIG. 12 shows another embodiment of the invention applied to a pillar of a church.
Figure 13A:
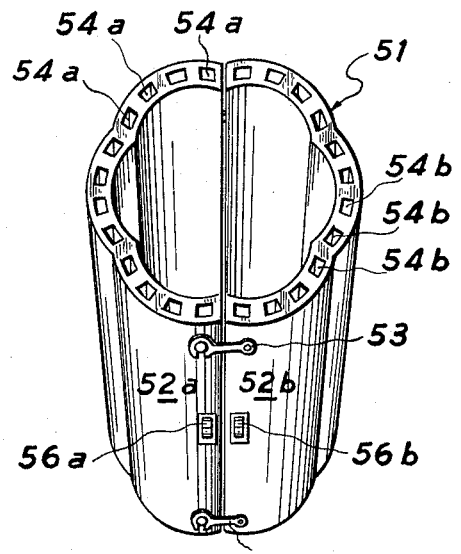
FIG. 13a is a perspective view of the body of the heater shown in FIG. 12, without the electrical resistance.
Figure 13B:
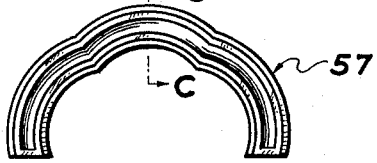
Figure 14:
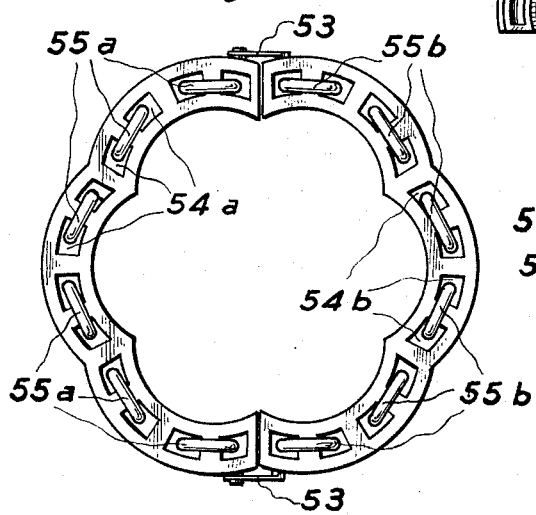
FIG. 14 is a top plan view of the body of FIG. 13a with the electrical resistance.
Figure 13C:
FIG. 13c is a section along line c—c of FIG. 13b.

FIGS. 12 to 14 show another embodiment of the invention in which the heater takes the shape of a heating panel to be applied against the column or pillar of a church. In FIG. 12 is shown a pillar 50 of a church against which two panels 51a and 51b have been applied.

FIG. 13a shows, in a perspective view a molded heating panel 51 before it has been provided with the electrical resistance. The heating panel 51 comprises two complementary portions 52a and 52b, coupled together by means of a fastener 53. Each portion 52a, 52b, is provided with longitudinal ducts 54a, 54b. As better seen in FIG. 14, an electrical resistance 55a, 55b is placed inside the ducts 54a, 54b. The ends of the conductors meet to form an electrical connection 56a, 56b.

In order to cover the ends of the ducts 54a, 54b, and the exposed parts of the electrical resistance, a strip 57 is provided at the top and bottom edges of the portions 51a, 51b (FIGS. 13b, 13c), said strip fitting by pressure and being also fixed by means of screws, similarly to strip 11 of the first embodiment. References 59a, 59b, 60, correspond to references 11a, 11b, 13, of FIG. 4. Usually one level of electrical resistance will be sufficient in this case.

A third embodiment of the invention is shown in FIGS. 15 to 18, in which a heating receptacle, which can be a bucket, is illustrated. According to this embodiment an initial blank plate 70 is molded from a thermoplastic material (thermosetting materials are not useful in this case). The plate 70 has a trapezoidal front surface and a trapezoidal back surface, the latter being of slightly bigger dimensions than the front surface. Transversal ducts 71 are made in the plate 70, going from the upper edge 70a to the lower edge 70b. Said lower edge is provided with an extension 72. An electrical resistance 73 is placed inside the ducts as shown in FIG. 15, the ends 72a, 72b emerging from the extreme lateral ducts. When a plate 70 is formed, it is subjected to heat until it becomes moldable and then it is made to assume the truncated conical form 70d shown in FIGS. 16 and 17 by putting in contact side edges 70c (FIG. 16). A connection 75 is applied to the window 74 in extension 72, said connection receiving the ends 72a, 72b, of the electrical resistance. An annular covering strip 76, having an inner longitudinal groove 77 and a flap 78 is fixed to the upper part of 70d by means of screws 79, thus covering the exposed parts of the electrical resistance emerging from the upper edge 70a. A bottom 80 (FIG. 18) is fixed to the lower edge 70b, said bottom having an annular recess 81 in which fits the annular projection 72 and an annular projection 82 which abuts against the inner portion of the edge 70b. An annular duct 82 is thus defined, said duct 82 having in its interior the exposed lower ends of the electrical resistance 73. A heating bucket as shown in FIG. 17 is then formed. Said bucket can be used to contain glasses, pots, etc., or to receive directly a liquid; in the latter case, the inner conducts 71, 77 and 82 must be sealed tight.

Figure 19:
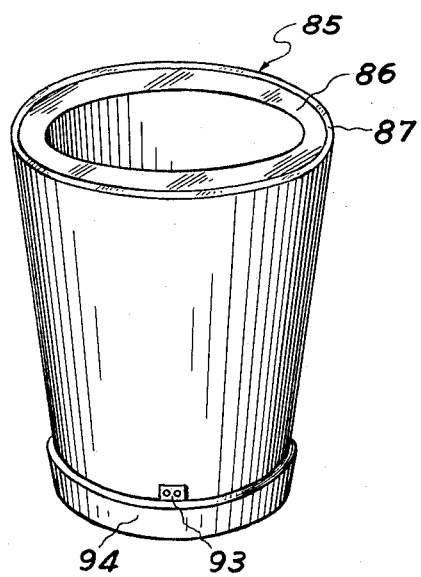
FIG. 19 is a perspective view of another receptacle embodying a heater according to the invention.
Figure 20:
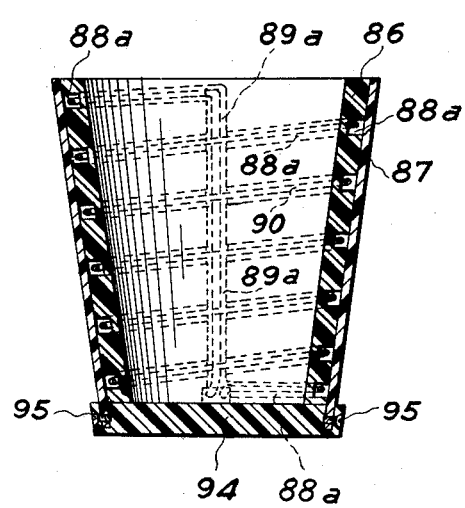
FIG. 20 is a longitudinal cross-section of the receptacle shown in FIG. 19.
Figure 21:
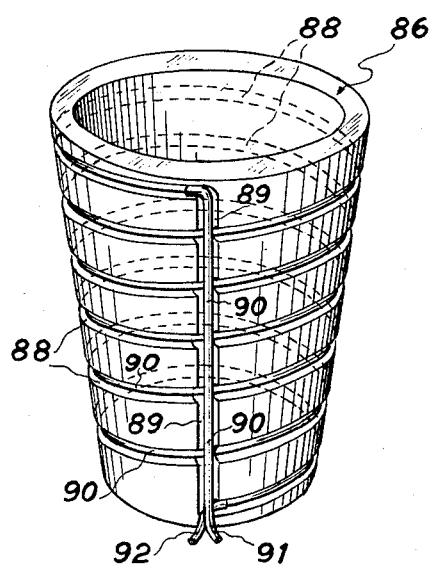
FIG. 21 is a perspective view of an inner portion of the side wall of a receptacle as shown in FIG. 20 showing grooves and electrical resistance.

According to another embodiment shown in FIGS. 19 to 21, for which thermosetting as well as thermoplastic material can be used, a receptacle 85 is made of two truncated conical tubular portions 86 and 87. The inner portion 86 (FIG. 21) is provided with a helical groove 88, having its ends united by means of a straight groove 89. An electrical resistance 90 is placed inside said grooves 88 and 89, the ends 91, 92 thereof meeting at the lower meeting ends of said channel. After the electrical resistance 90 has been mounted on inner portion 86, this inner portion is placed inside outer portion 87, the grooves 88 and 89 defining then with the inner surface of outer portion 87, a helical duct 88a and a straight duct 89a. The ends 91 and 92 end in the connection 93. The inner portion 86 fitting tightly inside outer portion 87, said ducts 88a, 89a, are sealed tight. A bottom 94 is fixed to the lower edge of the truncated conical body resulting from the coupling together of inner portion 86 and outer portion 87 by means of screws 95. The heating receptacle 85 can receive liquids directly for heating purposes.

This application relates to improvements over the relationship shown in application Serial No. 599,761, filed July 24, 1956, and now abandoned.

What is claimed is:

1. An electric heater comprising a body made of a synthetic moldable plastic material non-adhesive at atmospheric pressure at temperature ranging from —40° C. to +80° C., said body being of slight thickness as compared with its remaining dimensions and consisting of a plate, said plate being formed of a plurality of sheets, the upper and lower sheets being flat on their outer surface and having transversal projections on their inner surfaces, the intermediate sheets having transversal projections on both surfaces, the projections in one sheet being adapted to be coupled to the projections in the adjacent sheet, each two adjacent sheets defining between themselves a plurality of ducts connected one to another, said ducts being regularly distributed over the body and disposed on several levels, tight covering means defining together with said sheets a sealed tight inner space including said ducts, an electrical resistance in each level of ducts, each electrical resistance being loose within said inner space and being fixed to said body only at its two ends, the said electrical resistance being disposed along all the path defined by said ducts and being adapted to expand freely in said ducts, the length, cross-section and resistivity of the electrical resistance being such that the maximum temperature attainable in operation is substantially less than the softening temperature of the plastic material constituting the body, the said ends of the electrical resistance being provided with connecting means adapted to be connected to the source of electric current, and a selector switch adapted to connect at will each electrical resistance in series with the other electrical resistances.

2. An electric heater, comprising a body made of a synthetic moldable plastic material non-adhesive at atmospheric pressure at temperatures ranging from —40° C. to +80° C., said body being of slight thickness as compared with its remaining dimensions, and consisting of a plate, said plate being formed wtih a plurality of sheets, the upper and lower sheets being flat on their outer surface and having transversal projections from one end of the surface to the opposite end, the intermediate sheets having laterally spaced transverse projections from one end of both surfaces to the opposite end, the projections in one sheet being adapted to be coupled to the projections in the adjacent sheet, each two adjacent sheets defining between themselves a plurality of ducts, said ducts passing through the plate from its upper edge to its lower edge and being disposed on several levels, the upper and lower edges being provided with a covering strip having in its inner surface a longitudinal groove, each groove defining with its corresponding edge a duct connecting the ends of all the passing ducts, an electrical resistance in each level of ducts, each electrical resistance being loose within said inner space and being fixed to said body only at its two ends, the said electrical resistance being disposed along all the path defined by said ducts and being adapted to expand freely in said ducts, the length, cross-section and resistivity of the electrical resistance being such that the maximum temperature attainable in operation is substantially less than the softening temperature constituting the body, the said ends of the electrical resistance being provided with connecting means adapted to be connected to the source of electric current, and a selector switch adapted to connect at will each electrical resistance in series with the other electrical resistances.

3. An electric heater comprising a body made of a synthetic moldable plastic material non-adhesive at atmospheric pressure at temperatures ranging from −40° C. to +80° C., said body being of slight thickness as compared with its remaining dimensions and consisting of a plurality of sheets, the upper and lower sheets being smooth on their outer surface and having transversal projections on their inner surfaces, the intermediate sheets having transverse projections on both surfaces, the projections in each sheet being adapted to be coupled to the projections in the adjacent sheet, each two adjacent sheets defining between themselves a plurality of ducts connected one to another, said ducts being regularly distributed over the body and disposed on several levels, tight covering means defining together with said sheets a tight inner space defining said ducts, at least one electrical resistance within said body, said electrical resistance being loose within said inner space and being fixed to said body only at its two ends, said electrical resistance being disposed along all the paths defined by said ducts, the said electrical resistance being adapted to expand freely in said ducts, the length, cross-section and resistivity of the electrical resistance being such that the maximum temperature attainable in operation is substantially less than the softening temperature of the plastic material constituting the body, the said ends of the electrical resistance being provided with connecting means adapted to be connected to the source of electric current.

4. An electric heater as claimed in claim 3, in which the body has the shape of a plate.

5. An electric heater as claimed in claim 3, in which the body has the shape of a part of a building and is adapted to be applied to said building.

6. An electric heater as claimed in claim 3, in which the body constitutes the side wall of a receptacle.

References Cited in the file of this patent

UNITED STATES PATENTS

| | | |
|---|---|---|
| 2,612,585 | McCann | Sept. 30, 1952 |
| 2,619,580 | Pontieri | Nov. 25, 1952 |
| 2,995,645 | Rankin | Aug. 8, 1961 |

FOREIGN PATENTS

| | | |
|---|---|---|
| 174,009 | Switzerland | Mar. 1, 1935 |
| 798,206 | Great Britain | July 16, 1958 |
| 983,731 | France | Feb. 14, 1951 |